United States Patent [19]
Mine

[11] Patent Number: 5,949,223
[45] Date of Patent: *Sep. 7, 1999

[54] POWER SOURCE APPARATUS HAVING FIRST AND SECOND SWITCHING POWER SOURCE UNITS

[75] Inventor: Ryuta Mine, Chiba, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/812,156

[22] Filed: Mar. 6, 1997

[30] Foreign Application Priority Data

Mar. 8, 1996 [JP] Japan ................................. 8-079396

[51] Int. Cl.$^6$ ...................................................... G05F 1/613

[52] U.S. Cl. ........................................... 323/224; 323/271

[58] Field of Search .................................. 323/224, 271, 323/266, 282

[56] References Cited

U.S. PATENT DOCUMENTS

| | | | |
|---|---|---|---|
| 3,585,491 | 6/1971 | Petersen | 323/271 |
| 4,964,029 | 10/1990 | Severinsky et al. | 363/80 |
| 5,216,351 | 6/1993 | Shimoda | 323/224 |

FOREIGN PATENT DOCUMENTS

| | | |
|---|---|---|
| 0483852A2 | 5/1992 | European Pat. Off. . |
| 0503715A1 | 9/1992 | European Pat. Off. . |
| 2497421 | 7/1982 | France . |

*Primary Examiner*—Shawn Riley
*Attorney, Agent, or Firm*—Fitzpatrick Cella Harper & Scinto

[57] ABSTRACT

A power source apparatus includes first and second switching power source units. The input of the second switching power source unit is connected to the output of the first switching power source unit. A large capacity capacitor is connected across the output of the first switching power source unit. When a motor connected across the output of the second switching power source unit is started, even if the motor enters a state in which a sudden peak current is needed, electric power is supplied from the large capacity capacitor, thereby preventing large current flow at the input side of the power source apparatus.

9 Claims, 6 Drawing Sheets

POWER SOURCE APPARATUS HAVING FIRST AND SECOND SWITCHING POWER SOURCE UNITS

BACKGROUND OF THE INVENTION

1. Field of the Invention

The invention relates to a switching power source apparatus for controlling an output voltage to a constant voltage by switching an input power source and, more particularly, to a switching power source apparatus which is used for a load such as to temporarily request a large peak current for a stationary output current.

1. Related Background Art

Figure 5:
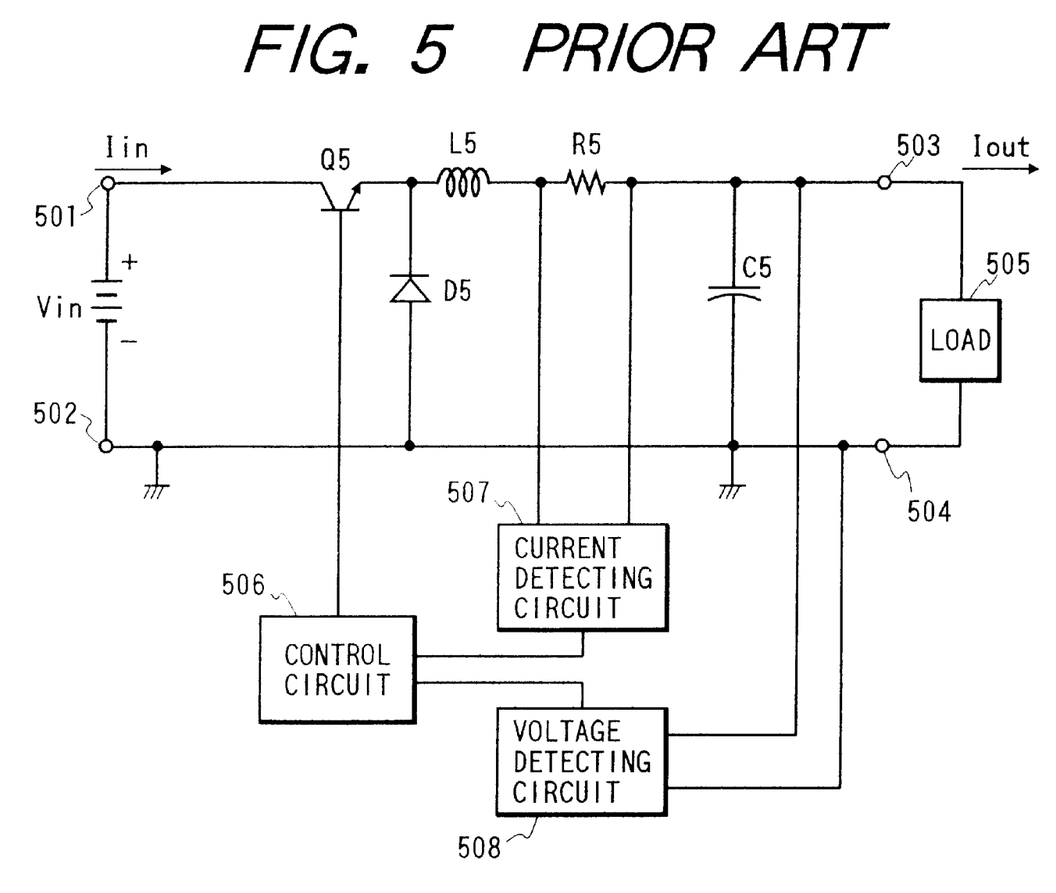
FIG. 5 is a block diagram showing a construction of a conventional switching power source apparatus.

FIG. 5 is a block diagram showing a construction of a conventional switching power source apparatus of a step-down chopper type. In the diagram, reference numerals 501 and 502 denote input terminals. A DC power source Vin is connected between the input terminals 501 and 502 and a DC voltage is supplied. Reference numerals 503 and 504 denote output terminals. A load 505 is connected between the output terminals 503 and 504. Q5 denotes a switching transistor in which a collector is connected to one input terminal 501, an emitter is connected to one terminal of a choke coil L5 and a cathode of a diode D5, and a base is connected to a control circuit 506.

Another terminal of the choke coil L5 is connected to one terminal of a current detecting resistor R5 and a current detecting circuit 507. Another terminal of the resistor R5 is connected to the plus side of a smoothing capacitor C5, the current detecting circuit 507, a voltage detecting circuit 508, and one output terminal 503. An output of the current detecting circuit 507 connected between the current detecting resistor R5 and an output of the voltage detecting circuit 508 connected to one output terminal 503 are connected to the control circuit 506. The other input terminal 502, the other output terminal 504, an anode side of the diode D5, and a cathode side of the smoothing capacitor C5 are commonly connected to the ground.

The operation of the switching power source apparatus of the step-down chopper type of such a construction will now be described.

When the DC power source Vin is supplied from the input terminals 501 and 502, a PWM (pulse width modulation) control is executed by the control circuit 506 on the basis of outputs of the current detecting circuit 507 and voltage detecting circuit 508 and a pulse which is pulse width modulated is supplied to the base of the switching transistor Q5. When the pulse is supplied to the base of the switching transistor Q5, the switching transistor Q5 is turned on/off. For a period of time during which the switching transistor Q5 is ON, energy is supplied to the choke coil L5, smoothing capacitor C5, and load 505. Since current flows, the energy is accumulated in the choke coil L5. In this instance, the diode D5 is OFF.

When the switching transistor Q5 is turned off, the energy accumulated in the choke coil L5 is supplied to the load 505 through the diode D5. The current detecting circuit 507 detects the current flowing in the current detecting resistor R5 and generates a signal to the control circuit 506. The voltage detecting circuit 508 detects the voltage (output voltage) at one output terminal 503 and generates a signal to the control circuit 506. The control circuit 506 changes a duty ratio of the pulse which is supplied to the base of the switching transistor Q5 so that an output voltage is made constant by a signal from the voltage detecting circuit 508.

Further, when an overvoltage occurs in the output or an overcurrent flows in the apparatus by a signal from the current detecting circuit 507, the control circuit 506 stops the operation of the switching transistor Q5, thereby keeping the output voltage constant and protecting the apparatus from the overcurrent and overvoltage.

A set value to protect against the overcurrent has to be set to a slightly large value so as to correspond to a peak output current.

Figure 6A:
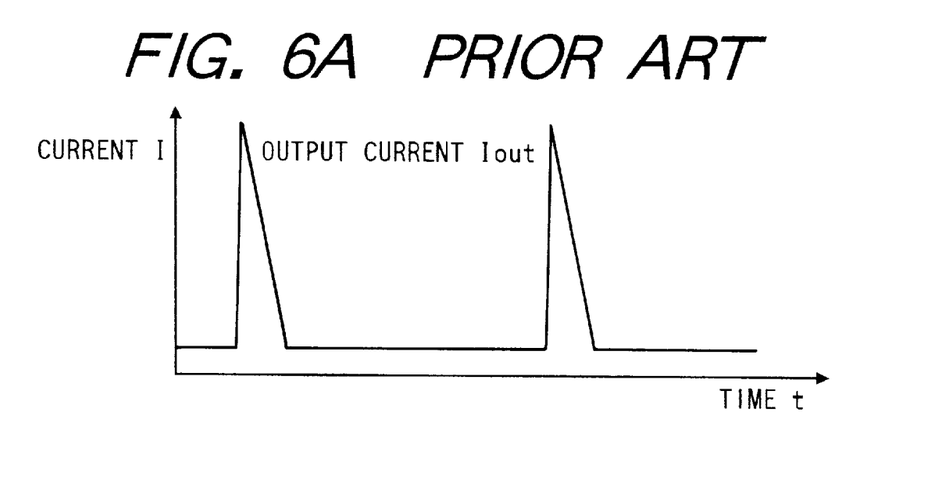
FIGS. 6A and 6B are diagrams showing current waveforms of respective portions of the conventional switching power source apparatus.

It is now assumed that the load 505 in FIG. 5 is, for example, a motor which is used for a paper feed in a copying apparatus or the like such that a sudden rotation is performed after a stop period or a sudden rotation and a stop are repeatedly carried out or, even if the motor is not a paper feed motor, when the motor is suddenly rotated as in a case where a rotational speed suddenly rises from a constant rotating state or the like, a very large peak current is requested for a stationary current (current when the motor is stopped or when it is rotated at a constant speed). For example, it is now assumed that a current as shown in an output current Iout in FIG. 6A is requested in the load (when the motor load is activated from a stop state, an output current suddenly increases and a peak current flows).

Figure 6B:
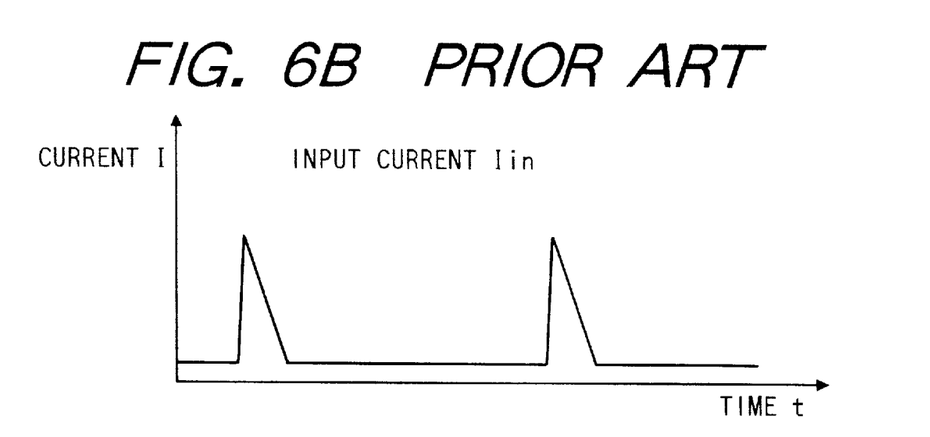

Input/output power in FIG. 5 will now be considered. Since the output power suddenly increases, the input power also obviously suddenly increases. In this instance, a peak current such as input current Iin in FIG. 6B also flows to the input side of the switching power source apparatus.

Although an explanation using the drawings is omitted, even in case of a power source apparatus (forward converter, flyback converter, etc.) in which a commercially available AC power source is inputted and AC is rectified and smoothed and switched through a transformer, thereby supplying electric power to the secondary side, when it is used for the load as mentioned above, a peak current flows to the input side.

In the conventional switching power source apparatus, when a sudden peak current is requested in the load (for example, at the time of an activation of the motor load or the like), since a large current also flows to the input side of the switching power source apparatus, as an input power source, a transformer, and circuit elements of the switching power source apparatus, those having large capacities have to be used so that they can cope with the peak current. There is a problem such that the output voltage drops when a temporary abnormality of the input power source (voltage drop, power supply interruption, or the like) occurs.

SUMMARY OF THE INVENTION

It is an object of the invention to provide a power source apparatus in which the foregoing drawbacks are eliminated.

Another object of the invention is to provide a switching power source apparatus which can reduce capacities of an input power source and each element and can obtain a stable output even if a temporary abnormality of the input power source occurs.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will now be described hereinbelow with reference to FIGS. 1, 2A, 2B, 2C, 3 and 4.

First Embodiment

Figure 1:
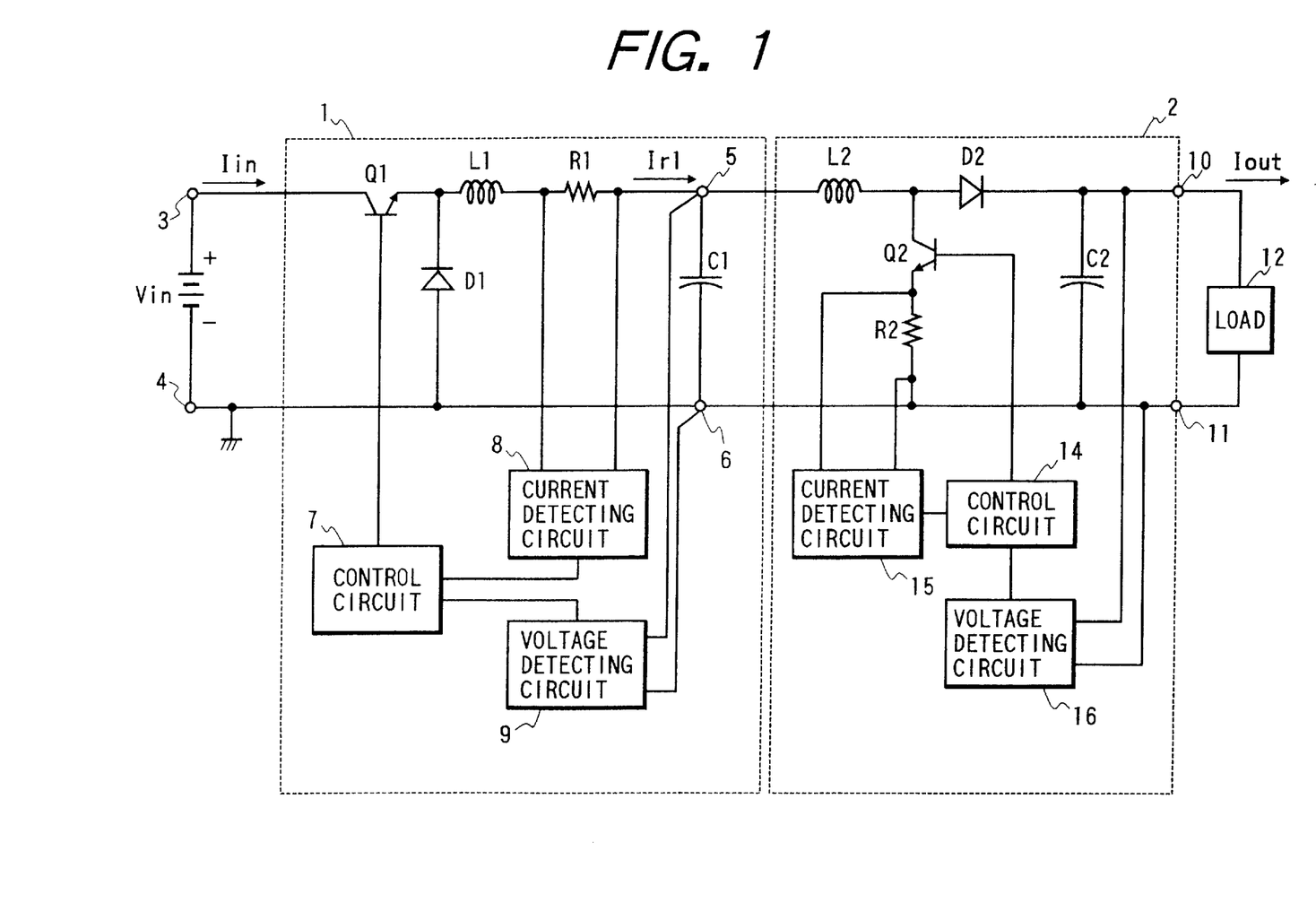
FIG. 1 is a block diagram showing a construction of a switching power source apparatus according to the first embodiment of the invention.

The first embodiment of the invention will be first explained with reference to FIGS. 1, 2A, 2B and 2C. FIG. 1 is a block diagram showing a construction of a switching power source apparatus of a step-up/down type chopper according to the first embodiment of the invention. In the diagram, reference numeral 1 denotes a first switching power source unit and 2 indicates a second switching power source unit. The first switching power source unit 1 has input terminals 3 and 4 and output terminals 5 and 6. The DC power source Vin is connected between the input terminals 3 and 4 for supplying DC voltage. A large capacity power accumulating and smoothing capacitor C1 is connected between the output terminals 5 and 6. The first switching power source unit 1 has a switching transistor Q1 in which a collector is connected to one input terminal 3, an emitter is connected to one terminal of a choke coil L1 and a cathode of a diode D1, and a base is connected to a control circuit 7.

Another terminal of the choke coil L1 is connected to one terminal of a current detecting resistor R1 and a current detecting circuit 8. Another terminal of the resistor R1 is connected to a plus side of the power accumulating and smoothing capacitor C1, the current detecting circuit 8, a voltage detecting circuit 9, and the output terminal 5. An output of the current detecting circuit 8 connected across the current detecting resistor R1 and an output of the voltage detecting circuit 9 connected to the output terminals 5 and 6 are connected to the control circuit 7. The 5 other input terminal 4, the other output terminal 6, an anode side of the diode D1, and a cathode side of the power accumulating and smoothing capacitor C1 are commonly connected to ground.

Input terminals of the second switching power source unit 2 are connected to the output terminals 5 and 6 of the first switching power source unit 1. The second switching power source unit 2 has output terminals 10 and 11. A load 12 is connected between the output terminals 10 and 11.

Now, assuming that a positive polarity side of the power accumulating and smoothing capacitor C1 is set to the terminal 5 side and a negative polarity side is set to the terminal 6 side, the circuit of FIG. 1 is constructed by: the first switching power source unit 1 in which the terminals 3 and 4 are set to inputs and the terminals 5 and 6 are set to outputs; the second switching power source unit 2 in which the terminals 5 and 6 are set to inputs and the terminals 10 and 11 are set to outputs; and the power accumulating and smoothing capacitor C1. As a whole, a switching power source apparatus of a step-up/down type chopper is formed.

A positive polarity side of the power accumulating and smoothing capacitor C1 is connected to a collector of a switching transistor Q2 through a choke coil L2 and is also connected to an anode side of a diode D2. A cathode side of the diode D2 is connected to a smoothing capacitor C2, the output terminal 10, and the load 12. An emitter of the switching transistor Q2 is connected to ground through a current detecting resistor R2. A current detecting circuit 15 is connected across the current detecting resistor R2 and an output signal from current detecting circuit 15 is inputted to a control circuit 14. A voltage detecting circuit 16 is connected between the output terminals 10 and 11 and its output is inputted to the control circuit 14. The input terminal 4, the output terminal 11, the anode side of the diode D1, the minus side of the smoothing capacitor C2, the minus side of the power accumulating and smoothing capacitor C1, and one end of the current detecting resistor R2 are commonly connected to ground.

The operation of the switching power source apparatus according to the embodiment of the above construction will now be described. When a DC power source is supplied from the input terminals 3 and 4, on the basis of detection values of the current detecting circuit 8 and voltage detecting circuit 9, the switching transistor Q1 is turned on/off by the control circuit 7 so that the output current and output voltage in the first switching power source unit 1 are set to certain predetermined values. For a period of time during which the switching transistor Q1 is ON, energy is supplied to the choke coil L1, power accumulating and smoothing capacitor C1, and second switching power source unit 2. Since current flows, energy is accumulated in the choke coil L1. At this time, the diode D1 is OFF. When the switching transistor Q1 is turned off, energy accumulated in the choke coil L1 is supplied to the second switching power source unit 2 through the diode D1.

The current detecting circuit 8 detects the current flowing in the resistor R1 and generates a detection signal to the control circuit 7. The voltage detecting circuit 9 detects the voltage (output voltage of the first switching power source unit 1) at the output terminal 5 and generates a detection signal to the control circuit 7. On the basis of the signals from the current detecting circuit 8 and voltage detecting circuit 9, the control circuit 7 changes a duty ratio of a driving pulse which is supplied to the base of the switching transistor Q1 so that the current flowing in the resistor R1 and the voltage between the output terminals 5 and 6 are set to certain predetermined values, namely, the output of the first switching power source unit 1 is set to a constant voltage and constant current output, thereby on/off controlling the switching transistor Q1. A protection to stop the operation of the switching transistor Q1 is performed against an overcurrent and an overvoltage in the first switching power source unit 1.

A set value to protect from the overcurrent is set to a slightly low value, thereby suppressing peak current flow in the input current of the first switching power source unit 1. The DC power derived between the output terminals 5 and 6 as mentioned above is supplied to the second switching power source unit 2. When DC power is supplied to the second switching power source unit 2, on the basis of the detection values of the current detecting circuit 15 and voltage detecting circuit 16, the switching transistor Q2 is turned on/off by the control circuit 14 so that the output voltage is set to a predetermined value. For a period of time during which the switching transistor Q2 is ON, current flows in the choke coil L2. In this instance, since current flows, energy is accumulated in the choke coil L2.

When the switching transistor Q2 is turned off, the energy accumulated in choke coil L2 passes through the diode D2 and is supplied to the load 12 connected to the output terminals 10 and 11. In this instance, the voltage between the output terminals 10 and 11 is set to a voltage in which a counter electromotive force of the choke coil L2 is added to the voltage between the output terminals 5 and 6 (output voltage of the first switching power source unit 1). The current detecting circuit 15 detects the current flowing in the current detecting resistor R2 and generates a detection signal to the control circuit 14. The voltage detecting circuit 16 detects the voltage (output voltage) between the output terminals 10 and 11 and generates a detection signal which is provided to the control circuit 14. On the basis of the signals from the current detecting circuit 15 and voltage detecting circuit 16, the control circuit 14 on/off controls the switching transistor Q2 so that the voltage between the output terminals 10 and 11 is set to a predetermined value.

Namely, the second switching power source unit 2 constant voltage controls the output voltage. When the overcurrent and overvoltage in the second switching power source unit 2 are detected by the current detecting circuit 15 and voltage detecting circuit 16, by stopping the operation of the switching transistor Q2 or by another method, the circuit is protected.

It is now assumed that the load 12 in FIG. 1 is a load such as a motor which is used for a paper feed in a copying apparatus or the like such that a sudden rotation is performed after a stop period or a sudden rotation and a stop are repeatedly carried out or, even if the motor is not a paper feed motor, when the motor is suddenly rotated as in a case where a rotational speed suddenly rises from a constant rotating state or the like, a very large peak current is requested for a stationary current (current when the motor is stopped or when it is rotated at a constant speed). It is a feature of the invention that when a peak current is requested, an electric power necessary for the load 12 is supplied from the power accumulating and smoothing capacitor C1 instead of the input power source from the input terminals 3 and 4.

Figure 2A:
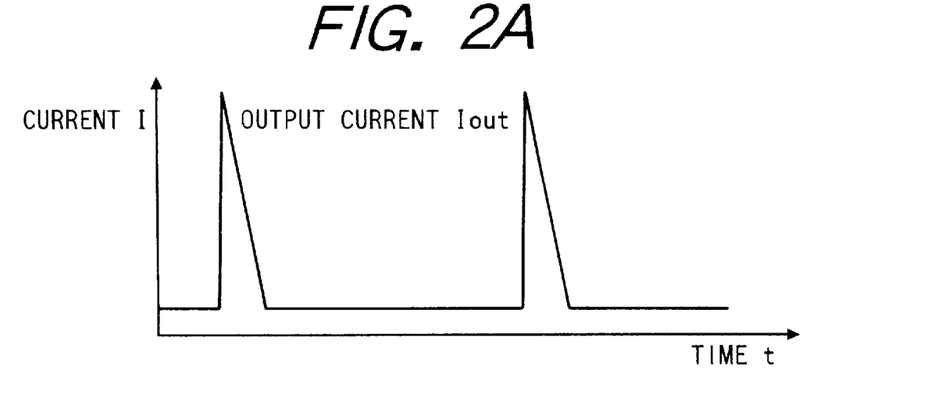
FIGS. 2A, 2B and 2C are diagrams showing current waveforms of respective portions of the switching power source apparatus.
Figure 2B:
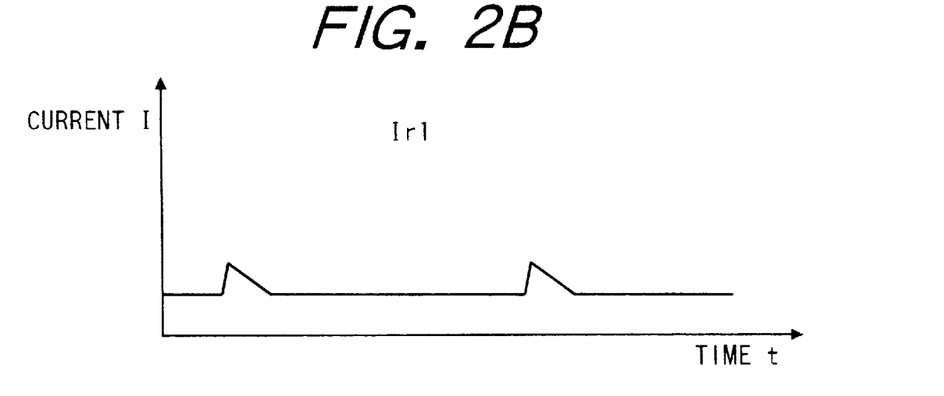
Figure 2C:
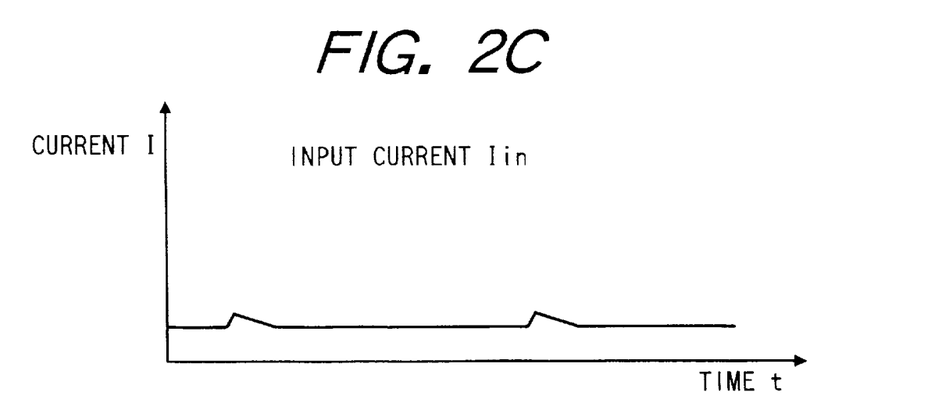

The operation in this instance will now be described. For example, it is assumed that a current as shown in Iout in FIG. 2A is requested for the load 12 (when the motor load is activated from a stop state, the output current suddenly increases and the peak current flows). At this time, in the second switching power source unit 2, since the output power suddenly increases, the input electric power also obviously suddenly increases. However, since the output of the first switching power source unit 1 as an input unit of the second switching power source unit 2 is always controlled to a constant voltage and a constant current, when the load 12 requests a current such that the input unit of the second switching power source unit 2 is set to a certain power or more, the electric power which was suddenly increased cannot be supplemented by only the output of the first switching power source 1. In such a case, a necessary electric power is also supplied from the power accumulating and smoothing capacitor C1 to the input unit of the second switching power source unit 2.

As mentioned above, when a sudden increase in current is requested for the load 12, by supplying the electric power to the second switching power source 2 from the power accumulating and smoothing capacitor C1 connected to the output unit of the first switching power source unit 1 and the input unit of the second switching power source unit 2, an output current (Ir1) of the first switching power source unit 1 is suppressed to a slight increase and the output of the first switching power source unit 1 can always maintaining a constant voltage and a constant current. Therefore, in the first switching power source unit 1, even when the load current (Iout) suddenly increases, the electric power which is supplied from the input terminals 3 and 4 doesn't suddenly increase. Namely, even when the load current (Iout) suddenly increases, the input current (Iin) is suppressed to a slight increase as compared with the increase in load current.

Therefore, there is no need to set the input power source to a large capacity in accordance with the peak value of the load current (Iout) and it is possible to cope with a temporary sudden increase in current of the load while maintaining a small capacity of the input power source. Even when a temporary abnormality of the input power source (voltage drop, power supply interruption, or the like) occurs, by supplying the electric power from the power accumulating and smoothing capacitor C1 to the second switching power source unit 2, a stable output is derived for the load 12.

Second Embodiment

Figure 3:
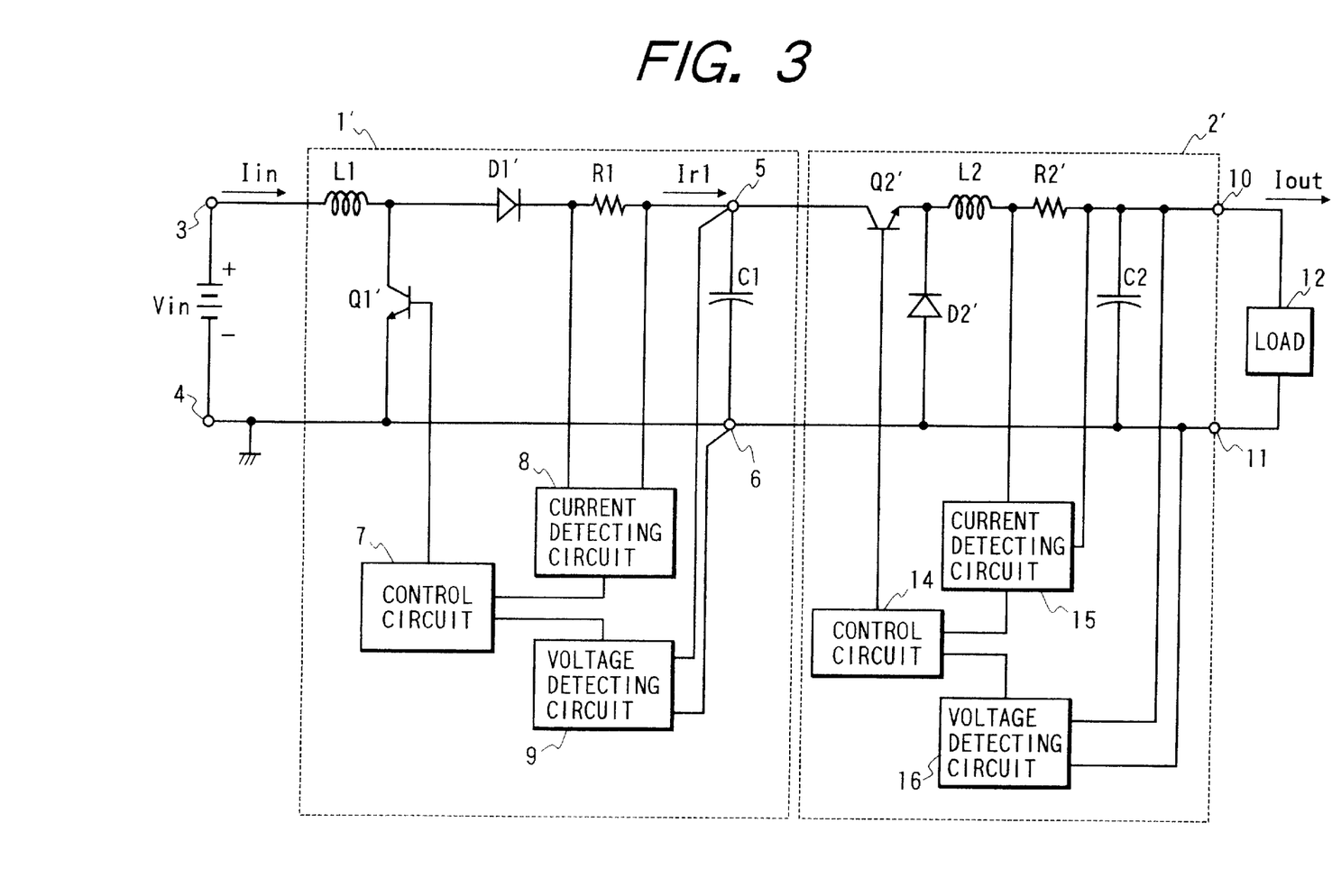
FIG. 3 is a block diagram showing a construction of a switching power source apparatus according to the second embodiment of the invention.

The second embodiment of the invention will now be described with reference to FIG. 3. FIG. 3 is a block diagram showing a construction of a switching power source apparatus according to the second embodiment of the invention. In the diagram, substantially the same portions as those in FIG. 1 regarding the foregoing first embodiment are designated by the same reference numerals.

The embodiment relates to a circuit in which a first switching power source unit 1' is constructed by a switching power source of a step-up type chopper and a second switching power source 2' is constructed by a switching power source of a step-down type chopper. Now, assuming that a positive polarity side of the power accumulating and smoothing capacitor C1 is set to the output terminal 5 and a negative polarity side is set to the output terminal 6, the circuit is constructed by: the first switching power source unit 1' in which the input terminals 3 and 4 are set to inputs and the output terminals 5 and 6 are set to outputs; and the second switching power source unit 2' in which the output terminals 5 and 6 are set to inputs and the output terminals 10 and 11 are set to outputs. As a whole, a switching power source of a step-up/down type chopper is formed.

A construction of the first switching power source unit 1' will now be described. Reference numerals 3 and 4 denote the input terminals and the DC power source Vin is connected thereto. The input terminal 3 is connected to a collector of a switching transistor Q1 through the choke coil L1 and to an anode side of a diode D1'. A cathode side of the diode D1' is connected to the current detecting resistor R1. Another end of the current detecting resistor R1 is connected to the output terminal 5, namely, the power accumulating and smoothing capacitor C1. The current detecting circuit 8 is connected across the current detecting resistor R1 and its output signal is inputted to the control circuit 7. The voltage detecting circuit 9 is connected between the output terminals 5 and 6, namely, across the power accumulating and smoothing capacitor C1 and its output is inputted to the control circuit 7.

Since a circuit construction of the second switching power source unit 2' is almost the same as the foregoing conventional construction of FIG. 5, its detailed description is omitted. The second switching power source unit 2' differs from the circuit construction of the conventional one with respect to a point that a power source to be inputted is not a DC power source but is an output of the first switching power source unit 1'. The input terminal 4, output terminal 11, an anode side of a diode D2', the cathode side of the smoothing capacitor C2, the cathode side of the power accumulating and smoothing capacitor C1, and the collector of the switching transistor Q1' are commonly connected to ground.

The operation of the switching power source apparatus according to the embodiment will now be described. When the DC power source is supplied from the input terminals 3 and 4, on the basis of the detection values of the current detecting circuit 8 and voltage detecting circuit 9, the switching transistor Q1' is turned on/off by the control circuit 7 so that the output current (current flowing in the resistor R1) and an output voltage (voltage between the output terminals 5 and 6) are set to certain predetermined values in the first switching power unit 1'. For a period of time during which the switching transistor Q1' is ON, the current flows in the choke coil L1. In this instance, since the current flows, energy is accumulated in the choke coil L1.

When the switching transistor Q1' is subsequently turned off, the energy accumulated in the choke coil L1 passes through the diode D1' and is supplied to the load (second switching power source unit 2') connected to the output terminals 5 and 6. In this instance, the voltage between the output terminals 5 and 6 of the first switching power source unit 1' is set to a voltage in which a counter electromotive force of the choke coil L1 is added to the input voltage from the DC power source connected between the input terminals 3 and 4. The current detecting circuit 8 detects the current flowing in the current detecting resistor R1 and generates a detection signal to the control circuit 7. The voltage detecting circuit 9 detects the voltage (output voltage) between the output terminals 10 and 11 and generates a detection signal to the control circuit 7.

On the basis of the signals from the current detecting circuit 7 and voltage detecting circuit 9, the control circuit 7 changes a duty ratio of a driving pulse which is supplied to a base of the switching transistor Q1' so that the voltage between the output terminals 5 and 6 is set to a certain predetermined value and the current flowing in the current detecting resistor R1 is set to a certain predetermined value, namely, the output of the first switching power source unit 1' is set to a constant voltage and a constant current output, thereby on/off controlling the switching transistor Q1'. When the current flowing in the current detecting resistor R1 and the voltage between the output terminals 5 and 6 are set to certain predetermined values or more, by stopping the output of the control circuit 7 or by another method, the circuit is protected. A set value for protection against overcurrent is set to a slightly low value, thereby suppressing peak current flow in the input current of the first switching power source unit 1'.

The operation of the second switching power source unit 2' will now be described. When the electric power is supplied from the first switching power source unit 1' to the output terminals 5 and 6 as input terminals of the second switching power source unit 2', a PWM control is executed by the control circuit 14 on the basis of the outputs of the current detecting circuit 15 and voltage detecting circuit 16. The pulse is supplied to a base of the switching transistor Q2'. When the pulse is supplied to the base of the switching transistor Q2', the switching transistor Q2' is turned on/off. For a period of time during which the switching transistor Q2' is ON, energy is supplied to the choke coil L2, smoothing capacitor C2, and load 12. Since current flows, energy is accumulated in the choke coil L2. In this instance, the diode D2' is OFF.

Subsequently, when the switching transistor Q2' is turned off, the energy accumulated in the choke coil L2 is supplied to the load 12 through the diode D2'. The current detecting circuit 15 detects the current flowing in the current detecting resistor R2' and generates a detection signal to the control circuit 14. The voltage detecting circuit 16 detects the voltage (output voltage) at the output terminal 10 and generates a detection signal to the control circuit 14. The control circuit 14 changes a duty ratio to turn on/off the switching transistor Q2' so that the output voltage is set to be constant by the signal from the voltage detecting circuit 16, thereby keeping the output voltage constant. When the overcurrent and overvoltage in the second switching power source unit 2' are detected by the current detecting circuit 15 and voltage detecting circuit 16, by stopping the operation of the switching transistor Q2' or by another method, the circuit is protected.

It is now assumed that the load 12 in FIG. 3 is a load such as a motor which is used for a paper feed in a copying apparatus or the like such that a sudden rotation is performed after a stop period or a sudden rotation and a stop are repeatedly carried out or, even if the motor is not a paper feed motor, when the motor is suddenly rotated as in a case where a rotational speed suddenly rises from a constant rotating state or the like, a very large peak current is requested for a stationary current (current when the motor is stopped or when it is rotated at a constant speed). It is a feature of the invention that when peak current is requested, electric power necessary for the load is supplied from the power accumulating and smoothing capacitor C1 instead of the input power source from the input terminals 3 and 4.

The operation in this instance will now be described. For example, it is assumed that a current as shown in Iout in FIG. 2A is requested for the load (when the motor load is activated from a stop state, the output current suddenly increases and the peak current flows). At this time, in the second switching power source unit 2', since the output power suddenly increases, the input electric power also obviously suddenly increases. However, since the output of the first switching power source unit 1' as an input unit of the second switching power source unit 2' is always controlled to a constant voltage and a constant current, when the load requests a current such that the input unit of the second switching power source unit 2' is set to a certain power or more, the electric power which was suddenly increased cannot be supplemented by only the output of the first switching power source unit 1'. In such a case, a necessary electric power is also supplied from the power accumulating and smoothing capacitor C1 to the input unit of the second switching power source unit 2'.

As mentioned above, when a sudden increase in current is requested for the load, by supplying the electric power to the second switching power source 2' from the power accumulating and smoothing capacitor C1 connected to the output unit of the first switching power source unit 1' and the input unit of the second switching power source unit 2', an output current of the first switching power source unit 1' is suppressed to a slight increase and the output of the first switching power source unit 1' can always maintaining a constant voltage and a constant current. Therefore, in the first switching power source unit 1', even when the load current suddenly increases, the electric power which is supplied from the input terminals 3 and 4 doesn't suddenly increase. Namely, even when the load current suddenly increases, the input current is merely increased as compared with the increase in load current.

Therefore, there is no need to set the input power source to a large capacity in accordance with the peak value of the load current and it is possible to cope with a temporary sudden increase in current of the load while maintaining a small capacity of the input power source. Even when a temporary abnormality of the input power source (voltage drop, power supply interruption, or the like) occurs, by supplying the electric power from the power accumulating and smoothing capacitor C1 to the second switching power source unit 2', stable output is derived for the load 12.

Third Embodiment

The third embodiment of the invention will now be described with reference to FIG. 4. The embodiment relates to a case where the input power source is set to a commercially available AC power source and a circuit between the input unit and the output unit has to be insulated.

Figure 4:
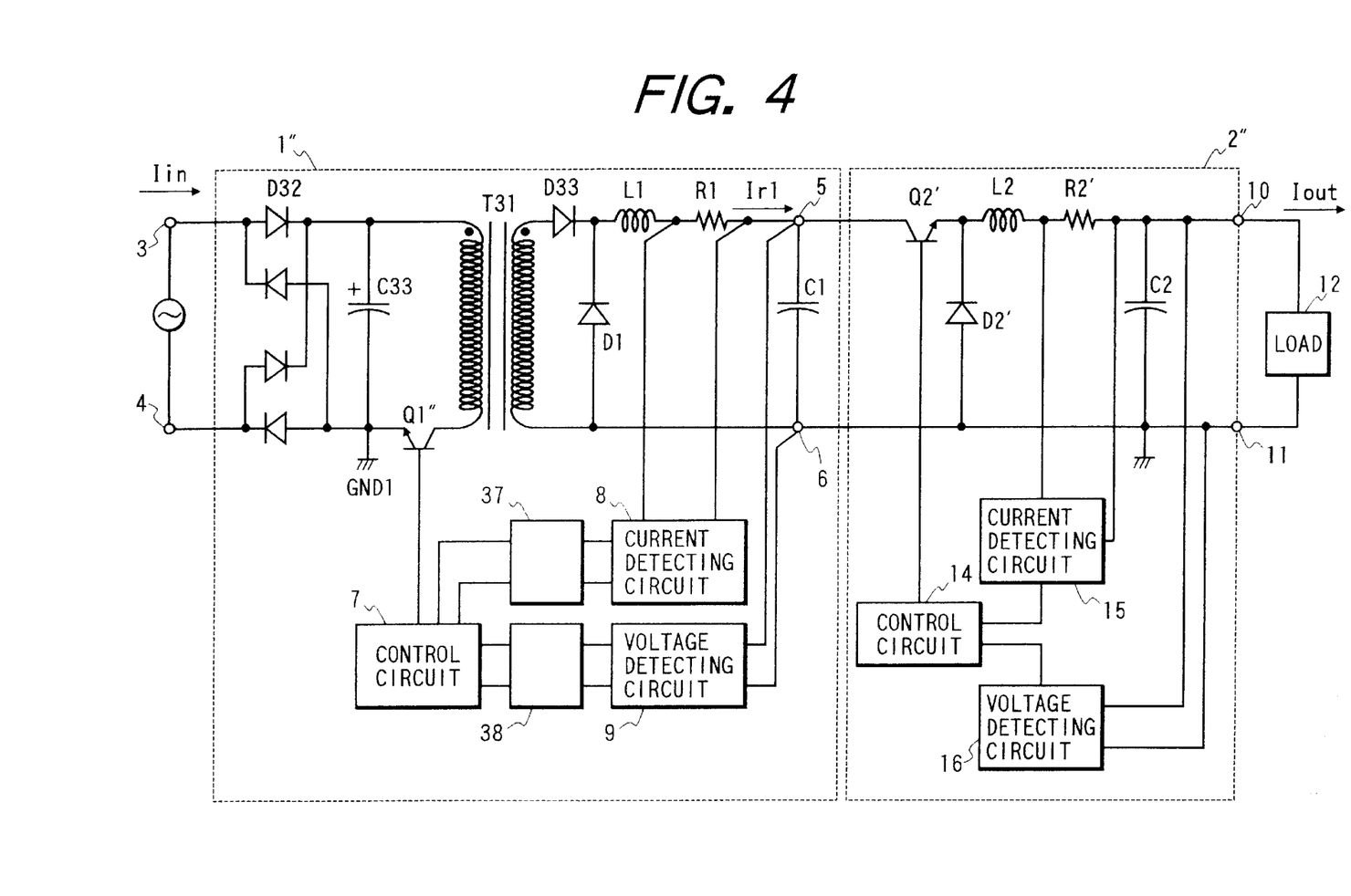
FIG. 4 is a block diagram showing a construction of a switching power source apparatus according to the third embodiment of the invention.

FIG. 4 is a block diagram showing a construction of a switching power source apparatus according to the third embodiment of the invention. In the diagram, substantially the same portions as those in FIGS. 1 and 3 mentioned above are designated by the same reference numerals.

In the embodiment, a first switching power source unit 1" is constructed by a general forward type switching power source. C1 denotes the power accumulating and smoothing capacitor and it is connected to the output terminals 5 and 6 of the first switching power source unit 1".

A circuit construction of the first switching power source unit 1" will now be described. A commercially available AC power source is connected to the input terminals 3 and 4. The input terminals 3 and 4 are connected to a diode bridge D32. An output of the diode bridge D32 is connected across a smoothing capacitor C33. A cathode side of the smoothing capacitor C33 is connected to an emitter of a switching transistor Q1" and is also connected to the ground. An anode side of the smoothing capacitor C33 is connected to a collector of the switching transistor Q1" through a primary side of a transformer T31. A base of the switching transistor Q1" is connected to the control circuit 7. One end of a secondary side of the transformer T31 is connected to the choke coil L1 through a diode D33 and another end is connected to the choke coil L1 through the diode D1. Another end of the choke coil L1 is connected to the output terminal 5 of the first switching power source unit 1" through the resistor R1 and to the anode side of the power accumulating and smoothing capacitor C1.

The cathode side of the power accumulating and smoothing capacitor C1 is connected to the output terminal 6, the anode side of the diode D1, and one end of the secondary side of the transformer T31. The current detecting circuit 8 is connected across the resistor R1. An output of the current detecting circuit 8 is connected to the control circuit 11 through a photocoupler 37. The voltage detecting circuit 9 is connected to the anode side of the power accumulating and smoothing capacitor C1 and to the output terminal 5. An output of the voltage detecting circuit 9 is connected to the control circuit 11 through a photocoupler 38. A second switching power source unit 2" is constructed by a power source of a step-down type chopper. Outputs (both of the output terminals 5 and 6) of the first switching power source unit 1" are supplied as inputs of the second switching power source unit 2". The output terminals 10 and 11 are set to the outputs of the second switching power source unit 2". The load 12 is connected to the output terminals 10 and 11.

A description of a circuit construction of the second switching power source unit 2" is omitted because it is the same as that of the second switching power source unit 2' in FIG. 3 according to the foregoing second embodiment.

The operation of the switching power source apparatus according to the embodiment will now be described.

First, the first switching power source unit 1" will be described. When a commercially available AC power source is supplied from the input terminals 3 and 4, AC is rectified by the diode bridge D32 and is smoothed by the smoothing capacitor C1. On the basis of the detection values of the current detecting circuit 8 and voltage detecting circuit 9, the switching transistor Q1" is turned on/off by the control circuit 7 so that an output current (current flowing in the resistor R1) and an output voltage (voltage between the output terminals 5 and 6) are set to certain predetermined values in the first switching power source unit 1". For a period of time during which the switching transistor Q1" is ON, a current flows in the primary side of the transformer T31, a current also flows in the secondary side through the diode D33, choke coil L1, and resistor R1, and an electric power is accumulated in the power accumulating and smoothing capacitor C1. Electric power is supplied to the second switching power source unit 2" connected to the output terminals 5 and 6. In this instance, since current flows, energy is accumulated in the choke coil L1.

When the switching transistor Q1" is subsequently turned off, energy accumulated in the choke coil L1 is supplied through the diode D1 to the load (second switching power source unit 2") connected to the output terminals 5 and 6. The current detecting circuit 8 detects current flowing in the resistor R1 and generates a detection signal which is provided to the control circuit 7 through the photocoupler 37. The voltage detecting circuit 9 detects the voltage (output voltage) between the output terminals 5 and 6 and generates a detection signal which is provided to the control circuit 7 through the photocoupler 38. On the basis of the detection signals, the control circuit 7 changes a duty ratio of a driving pulse which is supplied to the base of the switching transistor Q1" so that the voltage between the output terminals 5 and 6 is set to a constant value and current flowing in the resistor R1 is set to the constant value, namely, the output of the first switching power source unit 1" is set to a constant voltage and constant current is output, thereby on/off controlling the switching transistor Q1". When the current flowing in the resistor R1 and the voltage between the output terminals 5 and 6 are set to the constant values or more, by stopping the output of the control circuit 7 or another method, the circuit is protected. The set value for protection against overcurrent is set to a slightly low value, thereby suppressing peak current flow into the input current of the first switching power source unit 1".

Since the operation of the second switching power source unit 2" is the same as that of the second embodiment, its description is omitted.

In a manner similar to the first and second embodiments, for example, it is now assumed that the load requests current as shown in Iout in FIG. 2A (when the motor load is activated from a stop state, the output current suddenly increases and the peak current flows). In this instance, in the second switching power source unit 2", since an output electric power suddenly increases, an input electric power also obviously suddenly increases. However, since the output of the first switching power source unit 1" as an input unit of the second switching power source unit 2" is always controlled to the constant voltage and constant current, when the load requests a current such that the input unit of the second switching power source unit 2" is set to a certain electric power or more, the electric power which was suddenly increased cannot be supplemented by only the output of the first switching power source unit 1". In such a case, a necessary electric power is also supplied to the input unit of the second switching power source unit 2" from the power accumulating and smoothing capacitor C1. So long as a range where the peak current that is requested from the load side can be supplemented by the electric power accumulated in the power accumulating and smoothing capacitor C1, the power is not suddenly increased for the output current of the first switching power source unit 1" and can be always controlled to the constant current.

As mentioned above, when the load 12 requests a sudden current increase, by supplying electric power to the second switching power source unit 2" from the power accumulating and smoothing capacitor C1 connected to the output unit of the first switching power source unit 1" and the input unit of the second switching power source unit 2", output current of the first switching power source unit 1" can be suppressed to a slight increase. The output of the first switching power source unit 1" can always maintain the constant voltage and constant current. Therefore, in the first switching power source unit 1", even when the load current suddenly increases, the electric power which is supplied from the input terminals 3 and 4 doesn't suddenly increase.

Namely, even when the load current suddenly increases, the input current is merely slightly increased as compared with the increase in load current.

Therefore, since a transformer T31 and devices are used for the first switching power source unit 1", there is no need to use the transformer and devices each having a large capacity in accordance with the peak value of the load current. It is possible to cope with a temporary sudden increase in current of the load by a small capacity. Even if a temporary abnormality of input power source (voltage drop, power supply interruption, or the like) occurs, by supplying the electric power from the power accumulating and smoothing capacitor C1 to the second switching power source unit 2", a stable output is derived in the load 12.

The first switching power source unit 1" is not limited to the forward converter, a similar effect is obtained even if a flyback converter or a chopper regulator in which a commercially available transformer and a rectifying circuit are provided in an are used.

As described in detail above, by providing the power accumulating large capacity electrolytic capacitor in which electric power is always accumulated and by supplying an electric power from the power accumulating electrolytic capacitor to the load when the load current suddenly increases, the sudden increase in input current can be suppressed. Therefore, in case of a switching power source apparatus of a DC power source input type, a power source of a small capacity can be used as a power source which is used for an input. In case of a switching power source apparatus of a commercially available AC power source input type, capacities of the transformer and each device can be reduced. Even for a temporary abnormality of the input power source (voltage drop or output stop), a stable output is obtained in the load.

The present invention is not limited to the foregoing embodiments, many modifications and variations are possible within the spirit and scope of the appended claims of the invention.

What is claimed is:

1. A power source apparatus comprising:
    a first switching power source unit for outputting a voltage and a current by switching an input power source, said first switching power source unit having at least one first detection circuit, a first control circuit, and a first switching element, wherein said at least one first detection circuit detects at least one of the voltage and the current output by said first switching power source unit, and wherein said first control circuit controls said first switching element based on an output of said at least one first detection circuit for causing the voltage and the current output by said first switching power source unit to be substantially constant;

a second switching power source unit for receiving an output of said first switching power source unit as an input power source and for outputting a voltage to a load, said second switching power source unit having at least one second detection circuit, a second control circuit, and a second switching element, wherein said at least one second detection circuit detects at least one of the voltage output by said second switching power source unit and a current in said second switching power source unit, and wherein said second control circuit controls said second switching element based on an output of said at least one second detection circuit for causing the voltage output by said second switching power source unit to be substantially constant; and smoothing and accumulating means, connected in parallel between output terminals of said first switching power source unit, and connected in parallel between input terminals of said second switching power source unit, for smoothing the output of said first switching power source unit in a stationary state and for supplying an electric power to said second switching power source unit if a current flowing in said load increases when driving of the load starts.

2. An apparatus according to claim 1, wherein said load is a motor.

3. An apparatus according to claim 1, wherein said smoothing and accumulating means is a capacitor.

4. An apparatus according to claim 1, wherein each of said first and second switching power source units is a switching power source of a chopper type having a choke coil.

5. A power source apparatus comprising:
    a first power source circuit for outputting power, said first power source circuit having at least one first detection circuit, a first control circuit, and a first switching element, wherein said at least one first detection circuit detects at least one of a voltage and a current output by said first power source circuit, and wherein said first control circuit controls said first switching element based on an output of said at least one first detection circuit for limiting a value of the output current of said first power source circuit;

a capacitor, connected in parallel between output terminals of said first power source circuit, for storing the output power of said first power source circuit; and a second power source circuit for inputting the output power of said first power source circuit and for applying power to a load, said second power source circuit having at least one second detection circuit, a second control circuit, and a second switching element, wherein said at least one second detection circuit detects at least one of a voltage output by said second power source circuit and a current in said second power source circuit, and wherein said second control circuit controls said second switching element based on an output of said at least one second detection circuit, wherein, in a case where said second power source circuit needs a current of a level equal to or greater than a predetermined value at a time when driving of the load starts, the output power of said first power source circuit and the power stored in said capacitor are input to said second power source circuit.

6. An apparatus according to claim 5, wherein when beginning to drive the load, the load is a type of load that requires a current significantly greater than at other times.

7. An apparatus according to claim 6, wherein the load comprises a motor which is rapidly driven from a stopping state or a constant rotating state.

8. An apparatus according to claim 5, wherein said first power source circuit has a chopper circuit including an inductance element, a diode and the first switching element.

9. An apparatus according to claim 5, wherein said second power source circuit has a chopper circuit including an inductance element, a diode and the second switching element.

* * * * *

UNITED STATES PATENT AND TRADEMARK OFFICE
CERTIFICATE OF CORRECTION

PATENT NO.    : 5,949,223
DATED         : September 7, 1999
INVENTOR(S)   : RYUTA MINE                                Page 1 of 2

It is certified that error appears in the above-identified patent and that said Letters Patent is hereby corrected as shown below:

COLUMN 1

Line 39, "the" should be deleted.

COLUMN 3

Line 49, "5" should be deleted.

COLUMN 6

Line 4, "maintaining" should read --maintain--; and
    Line 50, "Q1" should read --Q1'--.

COLUMN 8

Line 2, "off, the" should read --off,--; and
    Line 57, "maintaining" should read --maintain--.

COLUMN 9

Line 8, "stable" should read --a stable--.

UNITED STATES PATENT AND TRADEMARK OFFICE
CERTIFICATE OF CORRECTION

PATENT NO.  :  5,949,223

DATED  :  September 7, 1999

INVENTOR(S)  :  RYUTA MINE

It is certified that error appears in the above-identified patent and that said Letters Patent is hereby corrected as shown below:

<u>COLUMN 11</u>

Line 41, "an" should read --an input--; and
    Line 58, "many" should read --and many--.

Signed and Sealed this

Twentieth Day of June, 2000

*Attest:*

*Attesting Officer*

Q. TODD DICKINSON

*Director of Patents and Trademarks*